Figure 1:
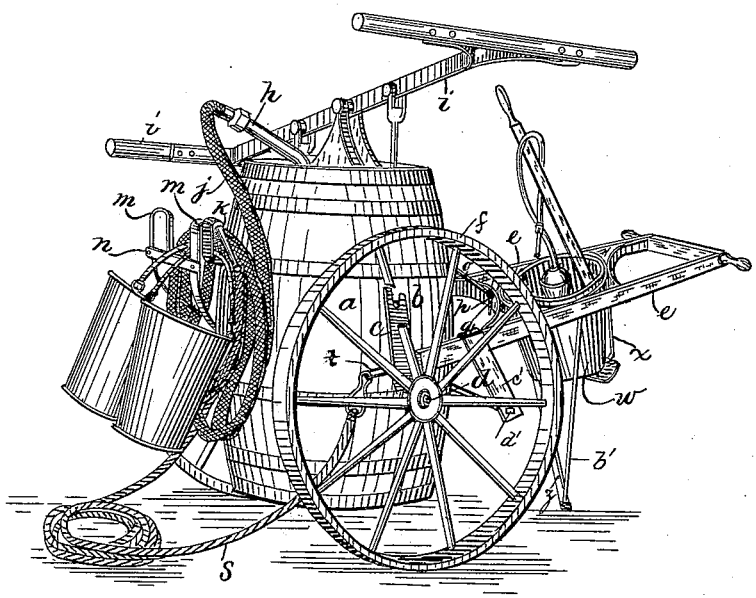

(No Model.)

R. MORRELL.
FIRE ENGINE.

No. 337,424.    Patented Mar. 9, 1886.

WITNESSES:
D. F. Morgan
C. H. Morgan

INVENTOR
Robt. Morrell.
By A. P. Thayer.
atty

UNITED STATES PATENT OFFICE.

ROBERT MORRELL, OF SUMMIT, NEW JERSEY.

FIRE-ENGINE.

SPECIFICATION forming part of Letters Patent No. 337,424, dated March 9, 1886.

Application filed October 13, 1884. Serial No. 145,429. (No model.)

*To all whom it may concern:*

Be it known that I, ROBERT MORRELL, a citizen of the United States, residing at Summit, in the county of Union and State of New Jersey, have invented new and useful Improvements in Fire-Engines, of which the following is a specification.

This invention relates to further improvements in the small portable hand-power fire-engine for use in small villages, on farms, in factories, and for private use, where larger and more expensive machines are not feasible, for which a patent was granted to me the 18th day of September, 1883, No. 285,055, and consisting, essentially, of a tank, cask, or barrel adapted for carrying water and containing a hand-power force-pump, with hose and a nozzle for throwing the water on a fire, and combined with a hand-truck for carrying it, with which said tank is detachably connectable, said tank and truck being arranged to enable the truck to be taken from the tank for use separately therefrom, and adapted for quickly connecting with the tank and taking it up from the ground for use in the case of fire.

The said additional improvements consist, first, of a rack attachment combined with the engine composed of said truck and tank, and attached to the side of the latter for a more convenient means of supporting the hose and fire-buckets employed with the engine where they will always be present when the machine is used as a fire-engine, but will be detached from the truck with the tank when the truck is to be used separately, and the location of said rack on the tank being such as not to interfere with the quick connection and disconnection of the truck and the tank; second, of a readily attachable and detachable stay to connect the tank with truck, for a means of preventing the tank from violently swinging and turning when running rapidly to a fire on the pivotal supports by which it is mounted on the truck, for enabling the tank to be taken up readily by the truck, and on which the thrusts of the truck by the roughness of the road sometimes overturns the tank and wastes the water without the stay; third, of rope-hitching attachments to the truck adapted for the connection of the ends of a long rope to the truck on the side opposite to the handles when it may be required to employ more hands than can conveniently work at the handle of the truck for rapidly drawing the machine, and when it may be preferred to employ the handles at the rear for guiding and steering the machine; and, fourth, the said invention also consists of a rack attachment to the truck-frame and the supporting-legs of the same, forming a simple contrivance for carrying an extra pail or bucket, or an extra engine of still smaller size, consisting of a hand-bucket with a pump, hose, and nozzle rigged in it, suitable for carrying into a room of a house and throwing a small jet on a fire, all as hereinafter fully described, reference being made to the accompanying drawings, in which—

Figure 2:
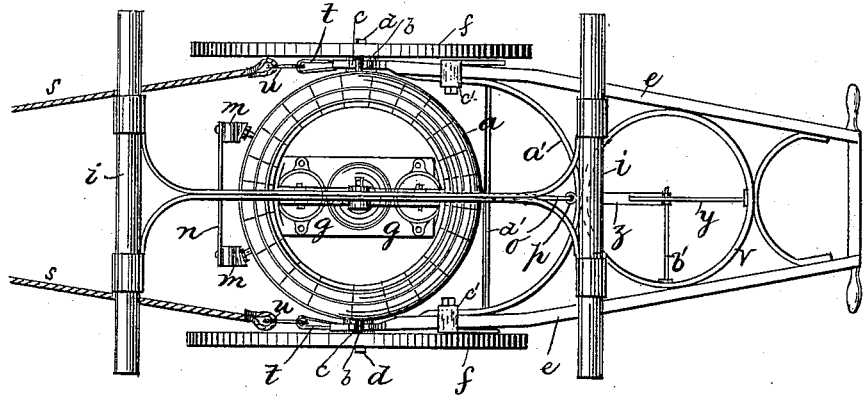
Figure 3:
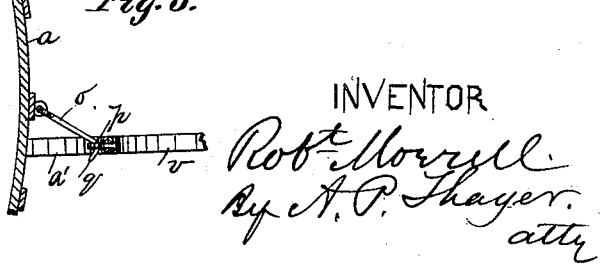

Figure 1 is a perspective view of the said improved fire-engine constructed in accordance with the said improvements. Fig. 2 is a plan view, and Fig. 3 is a detail.

The letter $a$ represents a barrel or cask having trunnions $b$ on opposite sides above the center of gravity of the cask, and supported in the notched upper ends of the supporting-arms $c$, extending upward from the truck-axles $d$, and at right angles from the side bars, $e$, of the truck-frame to which said axles are attached, and which is mounted by said axles on the wheels $f$, for the purposes of a hand-truck generally, and also for transporting the water-cask when required, the arrangement being such that the notched upper ends of the arms $c$ will swing downward by raising frame $e$ upward, so as to drop the cask on the ground and escape from under the trunnions when it is desired to disconnect the truck, and so as to be run under the trunnions and take up the cask when it is desired to connect the cask and the truck, thus enabling the truck to be disconnected from the cask readily when it is desired to use the truck for general purposes, and providing for taking up the cask in the most ready manner, when required.

The cask contains a force-pump, $g$, having a discharge-pipe, $h$, and suitable hand-brakes, $i$, for throwing the water contained in the tank on a fire through a hose, $j$, having a nozzle, $k$, at the end, as usual.

The cask is to be replenished by fetching water by hand with buckets $l$, or by any other available means; but the buckets will generally be used, and, together with the hose $j$, should be disposed with the rest of the apparatus in the most favorable position for being always at hand and readily available for use when wanted. I therefore propose that as the truck is to be detached from the cask for other uses not requiring the hose and the buckets, which are to be used only and exclusively with the cask, to apply a hose and bucket holding rack to one side of the tank for coiling the hose and hanging the buckets on, as shown, said rack consisting, preferably, of a couple of brackets of flat bar or strip metal suitably bent and attached in an upright position to form projecting prongs $m$ at suitable distances apart, and connected by a stay, $n$, on which the hose may be coiled and the buckets hung; but I do not mean to limit myself to any particular construction of the rack, which may of course be varied, according to the will of the constructor; but I consider the location of the rack on the cask which I have chosen a matter of considerable importance in the construction of these machines, the same being at the side of the cask which is back of or opposite to the frame, and is also at the space between the wheels, where neither the wheels nor the frame interfere with or obstruct the hanging of the hose and the buckets, and they do not interfere with the wheels nor the frame, which enables the truck and the cask to be as readily connected and disconnected with the hose and the buckets attached as without.

The stay for preventing the cask from rocking on its trunnions when the machine is running violently over the ground consists of a stay-rod, $o$, having an eye at one end and a hook at the other, and being connected with its eye to one and by its hook to the other, as preferred, so that being permanently connected to one—say the cask—so as always to be present when the truck and the cask are brought together, it may be detachably connected to the frame for ready connection and disconnection, the frame having an eye, $p$, into which the hook $q$ of the stay is thus engaged for effecting the connection.

For enabling a draft-rope, $s$, to be readily connected to the frame when the power of a greater number of persons is required for hauling the truck than is available at the handles, I attach the eye-loops $t$ to the ends of the side bars, $e$, of the truck-frame at the axles, and projecting in the opposite direction from the handles, suitably for the connection of the two ends of the draft-rope, one to each, to be hooked on by any approved form of hook or link, $u$, which will in practice be constructed suitably for hooking on detachably; or the loops $t$ may be made open or in the form of hooks, for the connection of endless rings or links $u$, as preferred.

For the rack in which to mount the bucket-engine $w$ on the truck-frame for being carried along with the rest, so as to be readily taken off when required, I arrange one of the cross-stays between the two side bars, $e$, of the frame in the form of a ring, $v$, of suitable size to allow the bucket to drop down within the ring nearly its whole length, and suspend a hanger, $x$, from the front side of said ring, extending as low as the bottom of the bucket is to be, and having a cross-bar, $y$, extending backward to and connected with the leg $z$, by which the truck-frame is held up when at rest, said leg being connected to the ring $v$ and the back cross-stay, $a'$, of the frame, at the middle of the latter, and extending downward suitably for the purposes of a leg, and having one or more lateral braces, $b'$, for staying it.

As the weight of the cask tends to twist the frame-bars $e$, in consequence of being supported between the wheels on the short independent axles, and thus deflect the wheels from their proper vertical range, I attach an arm, $c'$, to each bar $e$, a little in advance of the axle and extending forward and downward a suitable distance, to be connected together at their lower ends by a tension-rod, $d'$, extending across from one to the other in front of the cask, said arms being sufficiently rigid to effectually resist the twist of the side bars when thus held by the tension-rod.

What I claim, and desire to secure by Letters Patent, is—

1. The combination, in a fire-engine, of a cask or tank for containing the water, and a truck therefor open rearward from the tank, and on which the tank is detachably mounted by trunnion-pivots in the arrangement, enabling the truck to be detached by swinging up the truck-frame and setting the tank on the ground; also a rack for the support of the buckets and hose attached to the tank, and being thereby detachable from the truck with the tank, substantially as described.

2. In a fire-engine consisting of the water-tank and truck, substantially as described, the bucket-rack consisting of the stay-ring $v$, hanger $x$, cross-bar $y$, and the frame-legs $z$, combined and arranged with said truck, substantially as herein set forth.

3. The combination of the stay-arms $c'$ and tension-rod $d'$ with the cask $a$, trunnion-pivots $b$, bearings $c$, independent truck-axles $d$, wheels $f$, and the truck-frame bars $e$, said frame-bars being arranged with a free opening from the trunnions to the rear end for enabling the tank to be taken on and discharged from the truck-frame, as described.

In witness whereof I have hereunto signed my name in the presence of two subscribing witnesses.

ROBERT MORRELL.

Witnesses:
W. J. MORGAN,
S. H. MORGAN.